US 6,720,882 B2

(12) United States Patent
Davey

(10) Patent No.: US 6,720,882 B2
(45) Date of Patent: Apr. 13, 2004

(54) SELF-MONITORING METHOD AND APPARATUS FOR CONDITION MONITORING OF A STRUCTURE

(75) Inventor: Kenneth John Davey, Bassendean (AU)

(73) Assignee: Structural Monitoring Systems Ltd., West Perth (AU)

( * ) Notice: Subject to any disclaimer, the term of this patent is extended or adjusted under 35 U.S.C. 154(b) by 272 days.

(21) Appl. No.: 10/051,209

(22) Filed: Jan. 18, 2002

(65) Prior Publication Data

US 2002/0092355 A1 Jul. 18, 2002

(30) Foreign Application Priority Data

Jan. 18, 2001 (AU) .............................................. PR2603

(51) Int. Cl.[7] .............................................. G08B 21/00
(52) U.S. Cl. .......................... 340/611; 340/605; 73/37; 73/40; 137/557
(58) Field of Search ................................ 340/611, 606, 340/605; 73/37, 40; 137/557

(56) References Cited

U.S. PATENT DOCUMENTS

| | | |
|---|---|---|
| 3,918,291 A | 11/1975 | Pauly et al. |
| 4,104,906 A | 8/1978 | Oertle |
| 4,145,915 A | 3/1979 | Oertle |
| 4,651,557 A | 3/1987 | Cholet |
| 4,776,206 A | 10/1988 | Armstrong et al. |
| 4,979,390 A | 12/1990 | Schupack et al. |
| 5,078,005 A | 1/1992 | Krempel et al. |
| 5,404,747 A | 4/1995 | Johnston et al. |
| 5,544,520 A | 8/1996 | Graf et al. |
| 5,596,137 A | 1/1997 | Perry et al. |
| 5,770,794 A | 6/1998 | Davey |
| 6,223,587 B1 | 5/2001 | Chiocca |

FOREIGN PATENT DOCUMENTS

| | | |
|---|---|---|
| EP | 0 177 433 | 8/1985 |
| WO | WO 94/27130 | 11/1994 |

Primary Examiner—Julie Lieu
(74) Attorney, Agent, or Firm—Allen, Dyer, Doppelt, Milbrath & Gilchrist, P.A.

(57) ABSTRACT

A system for monitoring a structure includes cavities on an outer surface and a fluid source at substantially constant pressure coupled to the cavities through high fluid impedances to create pressure differentials therebetween. A telemetry system has pressure differential switches across each of the high impedances for monitoring differential pressure changes across the impedances and providing a signal indicative of the location of the cavity associated with the high impedance across which the change is monitored. A fluid capacitance is associated with each cavity and the corresponding impedances to facilitate a transient fluid flow through the impedances. The transient flow is produced by temporarily coupling the cavities to the reference pressure and then recoupling to the source, producing transient fluid flow through the fluid capacitance and a consequential transient differential pressure sequentially across each of the high fluid impedance devices, thereby inducing sequential cyclical switching of the differential pressure switches.

36 Claims, 13 Drawing Sheets

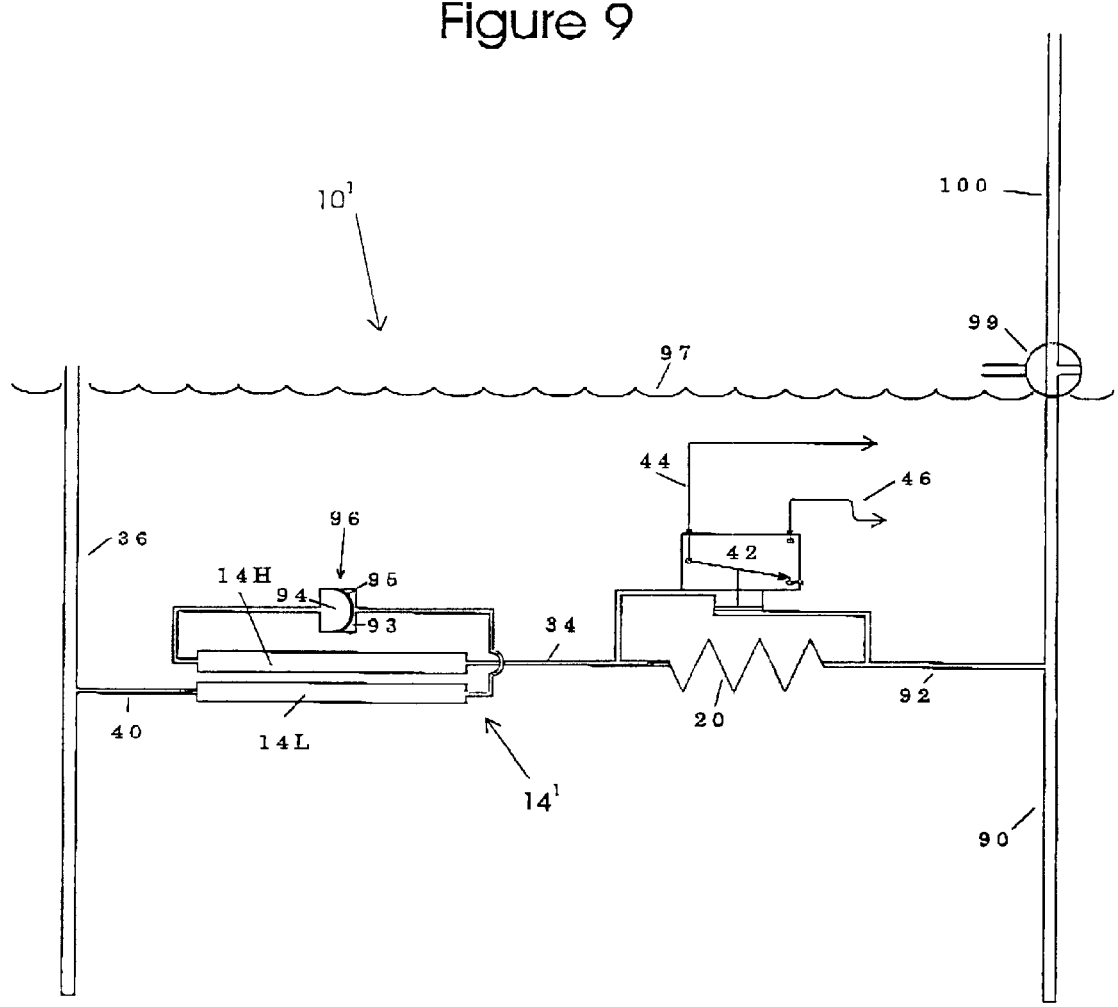

SELF-MONITORING METHOD AND APPARATUS FOR CONDITION MONITORING OF A STRUCTURE

FIELD OF THE INVENTION

The present invention relates to a method and system for the remote condition monitoring of a structure, such as for example a welded structure in remote, inaccessible, and submerged locations and, is particularly suited to pipelines including submerged steel catenary risers.

BACKGROUND OF THE INVENTION

Submerged or buried pipelines or other structures on locations such as mine sites, established chemical plants etc or in locations difficult to access, such as in nuclear power stations, or structurally sealed compartments in submarines present a problem in condition monitoring for the formation of cracking, which may arise due to vibration or dynamic loading. Often such cracking will initiate in a stress riser in the pipeline or structure, such as a weld or other joint. In the case of a pipeline, mobile internal pipe inspection equipment does not have the resolution to locate small flaws such as cracking of welds. Further, the use of such equipment often requires the shutdown of the pipeline in question. The monitoring of submarine compartments structurally sealed for long periods of time presents great difficulty for condition monitoring.

Also present known remote condition monitoring systems are often unreliable and difficult, if not impossible, to test. Accordingly it is at times hard to discern between the existence of an actual crack or a fault in the monitoring system itself.

SUMMARY OF THE INVENTION

It is an object of the present invention to provide a self-monitoring or self-testable method and system that facilitates remote condition monitoring of a structure to which it is applied, to give early warning of a flaw in a reliable and repeatable manner.

According to a first aspect of the present invention there is provided a self-monitoring or self-testable method for condition monitoring of a structure including the steps of:
  forming one or more substantially sealed first cavities on or between surfaces of, or within said structure;
  providing a fluid source of substantially constant pressure relative to a reference pressure where said constant pressure and said reference pressure are not the same;
  coupling said fluid source to said first cavities through respective high fluid impedance devices sufficient to create detectable respective pressure differentials between said source and said first cavities across said high impedance devices;
  providing a fluid capacitance in operative association with said first cavities and corresponding high fluid impedance devices to facilitate transient flow of fluid through said corresponding high fluid impedance devices; and,
  providing a telemetry system operatively associated with said high impedance devices for monitoring transient or varying pressure differential across each high impedance device and, when a change in said pressure differential is monitored, providing a signal indicative of the location of the cavities coupled with said high impedance device across which said pressure differential is monitored.

Preferably said step of providing a telemetry system includes providing a plurality of differential pressure switches, each switch coupled across a respective high impedance device.

Preferably said step of providing said telemetry system further includes:
  providing a fluid source pressure monitor switch having a first input in fluid communication with said fluid source and a second input in fluid communication with a said reference pressure, said fluid source pressure monitor switch arranged to change state when fluid pressure at its first input is substantially equal to the reference fluid pressure at its second input; and,
  configuring said telemetry system to provide a signal indicative of a change in state of said fluid source pressure monitor switch.

Preferably said step of providing a telemetry system further includes providing a signal communication path between said differential pressure switches and said fluid source pressure monitor switch enabling said telemetry system to communicate with said switches.

Preferably said differential pressure switches are coupled in said signal communication path in a manner to enable parallel communication with said telemetry system.

Preferably said fluid source pressure monitor switch is coupled in series in said signal communication path.

In one embodiment said signal communication path is provided as a radio signal path.

In another embodiment, said signal communication path is provided as a plurality of transmission lines where said differential pressure switches are coupled parallel with each other across said transmission lines. Advantageously, said fluid source pressure monitor switch is coupled in series with said transmission lines in order to monitor the pressure condition of the fluid at an end remote from the source and confirm complete continuity of said transmission lines. In one variation, when said structure is made from an electrically conductive material, one of said transmission lines is comprised of said structure.

Preferably the step of providing said telemetry system further includes providing an AC signal generator for producing AC signals of different frequencies and transmitting said AC signals along said transmission lines; and
  coupling a respective resonant trap or band pass filter in series with each differential pressure switch, said series resonance traps or band pass filters tuned to said different frequencies.

Preferably said method further includes coupling respective electrical chokes in parallel with each resonant trap or band pass filter.

In an alternate embodiment, said method includes the step of providing each switch with a unique address which is communicated via said transmission lines when a switch undergoes a change in state. In this embodiment said step of providing said telemetry system includes providing a processor based device in communication with said switches via said transmission lines for reading said addresses.

Preferably said step of providing said fluid source includes providing a gas at a substantially constant negative pressure relative to said reference pressure. When said reference pressure is ambient atmospheric pressure said negative pressure is a sub-atmospheric pressure. In this instance, advantageously said sub-atmospheric pressure is a vacuum. When said fluid source is a gas source said fluid capacitance is constituted by inherent elastic characteristic of gas provided by the source and the finite volume of at least said first cavities.

In an alternate embodiment, said step of providing said fluid source includes providing a liquid at a substantially constant pressure whilst the reference pressure is a liquid at a lower pressure.

In a further alternate embodiment, said step of providing said fluid source includes providing a liquid source at a substantially constant pressure whilst the reference pressure is a liquid at a higher pressure.

When using a liquid source said step of providing a fluid capacitance includes providing a pressure variable volume or simulated liquid capacitance such as an accumulator.

The provision of the fluid capacitance facilitates a self test or self monitoring behaviour that can be exploited by the sudden application of a fluid source of substantially constant pressure relative to a reference pressure, applied to the system wholly or separately to a particular cavity or cavities.

To facilitate the self-testing or self-monitoring feature, the method further includes the steps of:

temporarily coupling said first cavities to said reference pressure to substantially equalise fluid pressure in said first cavities and said high impedance devices with said reference pressure; and, subsequently recoupling said fluid source to said first cavities to produce a transient fluid flow through said fluid capacitance and a consequential transient differential pressure sequentially across each high fluid impedance device thereby inducing sequential cyclic switching of said differential pressure switches.

Preferably said method further includes providing one or more second cavities in proximity to said first cavities and placing said second cavities in fluid communication with said reference pressure.

According to another aspect of the present invention, there is provided a self-monitoring or self-testable system for condition monitoring of a structure including at least:

one or more of substantially sealed first cavities formed on or between surfaces of or within said structure;

a source of fluid at substantially constant pressure relative to a reference pressure where said constant pressure and said reference pressure are not the same, said source coupled to said first cavities through respective high fluid impedance devices sufficient to create detectable pressure differentials between said source and said cavities across said high fluid impedance devices;

a fluid capacitance in operative association with said first cavities and corresponding high fluid flow impedance device to facilitate transient flow of fluid through said corresponding high fluid flow impedance devices; and, a telemetry system operatively associated with said high fluid impedance devices for monitoring the transient or varying pressure differential across each high fluid impedance device and, when a change in pressure differential is monitored, providing a signal indicative of the location of the cavities coupled with the high fluid impedance device across which said pressure differential is monitored.

Preferably said telemetry system includes a plurality of differential pressure switches, each switch coupled across a respective high fluid impedance device.

Preferably said telemetry system further includes a fluid source pressure monitor switch having a first input in fluid communication with said fluid source and a second input in communication with said reference pressure, said fluid source pressure monitor switch arranged to change state when fluid pressure at its first input is substantially equal to fluid pressure at its second input, and wherein said telemetry system includes means for providing a signal indicative of a change in state of said fluid source switch.

Preferably said telemetry system includes a signal communication path between said differential pressure switches and said fluid source pressure monitor switch enabling said telemetry system to communicate with said switches.

Preferably said communication signal path provides parallel communication between said differential pressure switches and said telemetry system.

Preferably said fluid source pressure monitor switch is coupled in series in said signal communication path.

In one embodiment, said signal communication path is a radio signal path and said telemetry system includes a plurality of radio transceivers one provided at each of said differential pressure switches and said fluid source pressure monitor switch.

In an alternate embodiment, said signal communication path includes a plurality of transmission lines with which said differential pressure switches and said fluid source pressure monitor switch are connected.

In one embodiment, when said structure is made of an electrically conductive material, one of said transmission lines is comprised of said structure.

In one embodiment, said telemetry system further includes a plurality of resonant traps or band pass filters each tuned to different frequencies, respective ones of said resonant traps or band pass filters connected in a series with respective differential pressure switches.

Preferably said telemetry system further includes a plurality of electrical chokes, wherein individual chokes are coupled in parallel with respective resonant traps or band pass filters.

Preferably said telemetry system further includes an AC signal generator for producing AC signals of different frequencies for transmission to said differential pressure switches via said transmission lines.

In an alternate embodiment, each differential pressure switch is provided with a unique address which is communicated via said transmission lines when said switch undergoes a change in state. In this embodiment preferably said telemetry system includes a processor-based device in communication with said switches via said transmission lines for reading said addresses.

Preferably said fluid source includes a gas source at a constant negative pressure relative to said reference pressure.

In an alternate embodiment, said fluid source includes a source of a liquid at a substantially constant pressure relative to the pressure of a reference liquid. In this embodiment, said cavities includes first and second groups of sub cavities, said first group of sub cavities interleaves with said second group of sub cavities, said first group of sub cavities in fluid communication with said liquid source and said second group of sub cavities in fluid communication with said reference pressure.

Preferably, when said fluid is a liquid, said fluid capacitance includes respective pressure variable volumes, such as accumulators coupled in series with said high fluid impedance devices for transient displacement of fluid relative to the cavities coupled to said high fluid impedance devices and a further fluid capacitance or pressure variable volume in fluid communication with said fluid source at a location beyond a most distant high fluid impedance device to provide transient displacement with respect to said source.

Preferably, when said structure is in the form of a pipeline, said cavities are formed circumferentially on one or both of an outer circumferential surface and an inner circumferential surface of said pipeline. Further, when said pipeline is formed of a plurality of pipes joined together by circumferential welds, said cavities are formed over said circumferential welds.

BRIEF DESCRIPTION OF THE DRAWINGS

FIG. 9 is a schematic representation of a fifth embodiment of the present invention incorporating the sensor cavity depicted in FIG. 8;

DETAILED DESCRIPTION OF PREFERRED EMBODIMENTS

Figure 1:
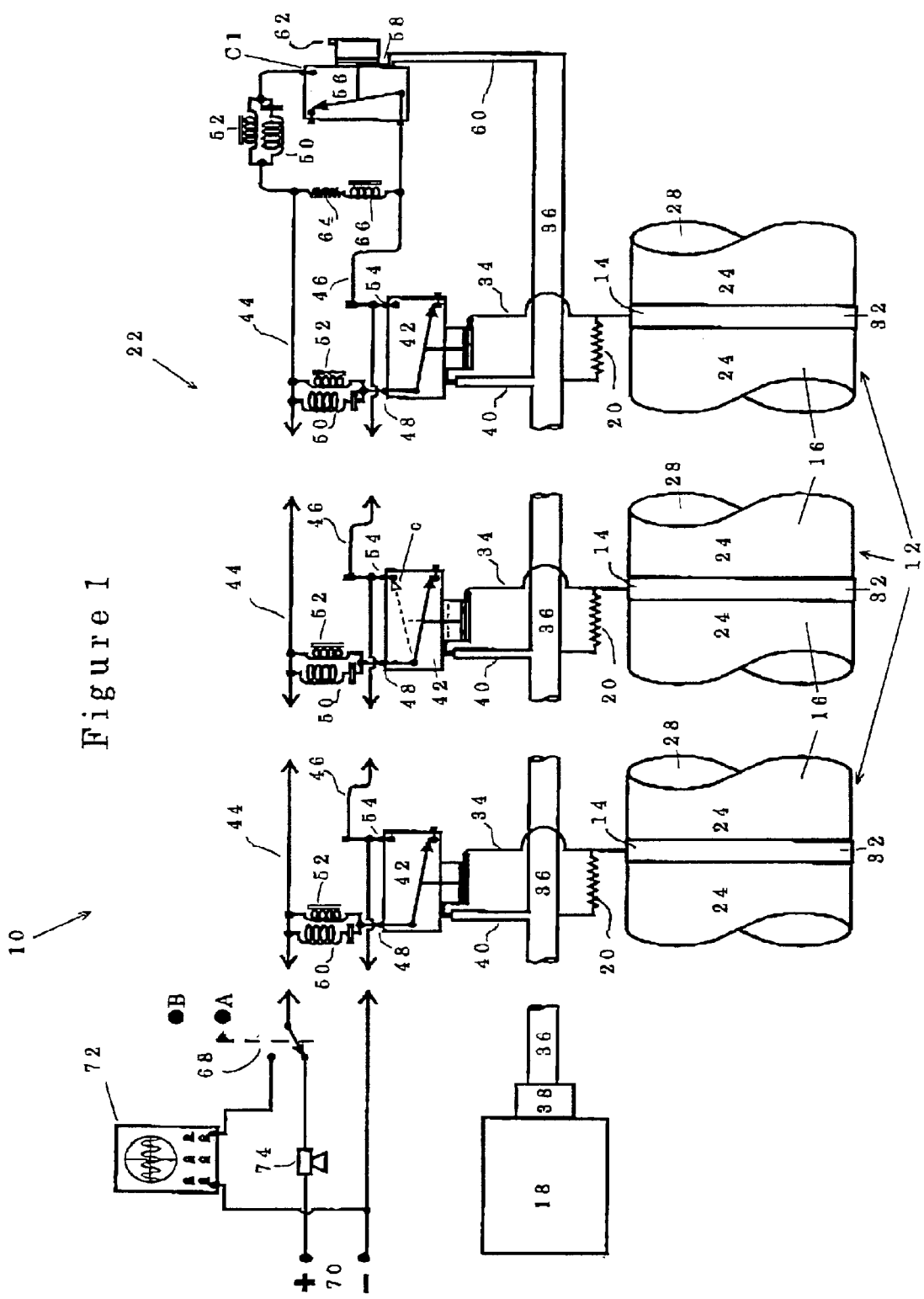
FIG. 1 is a schematic representation of an embodiment of the present invention.
Figure 2:
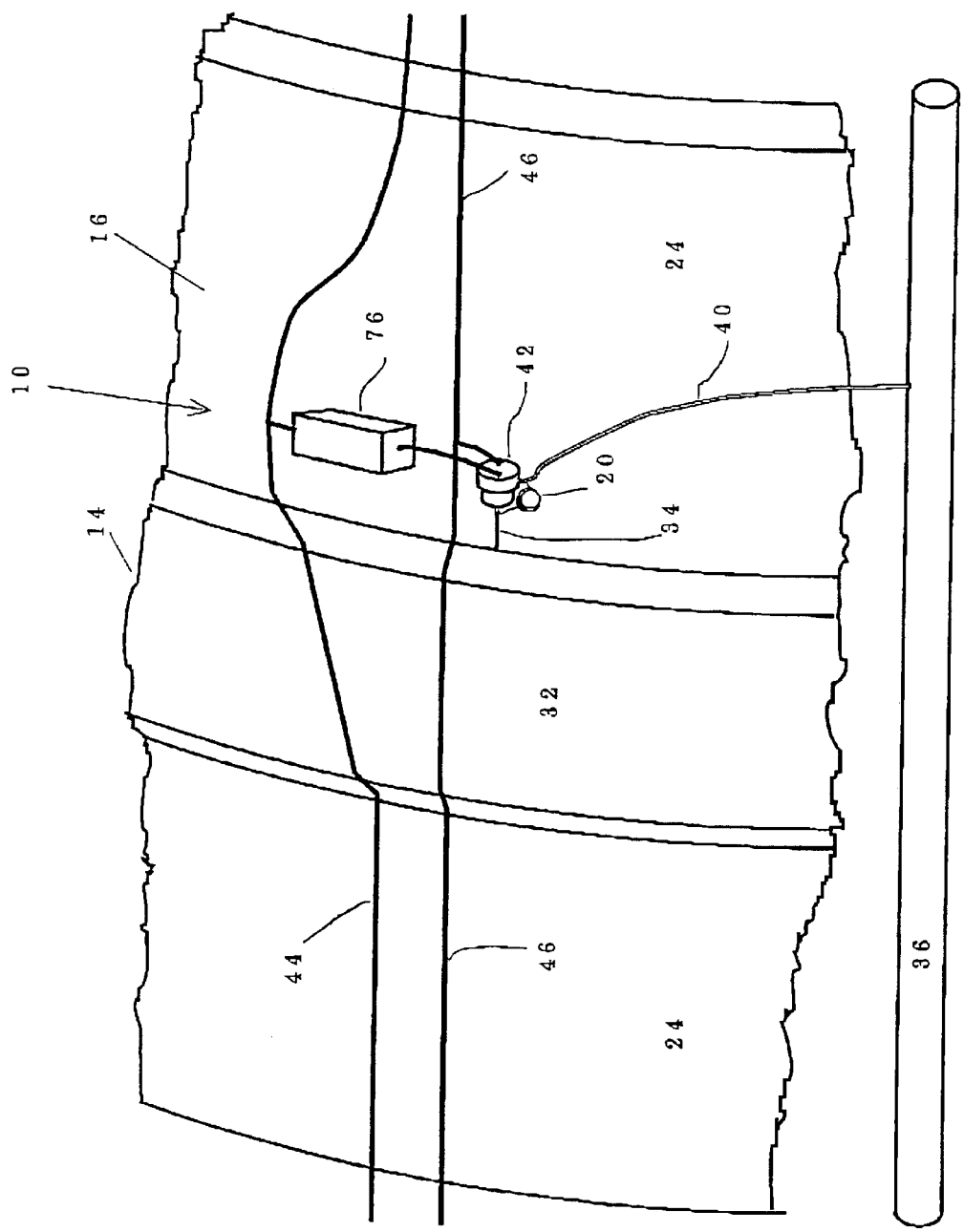
FIG. 2 illustrates an embodiment of the present invention coupled to a pipeline.
Figure 3:
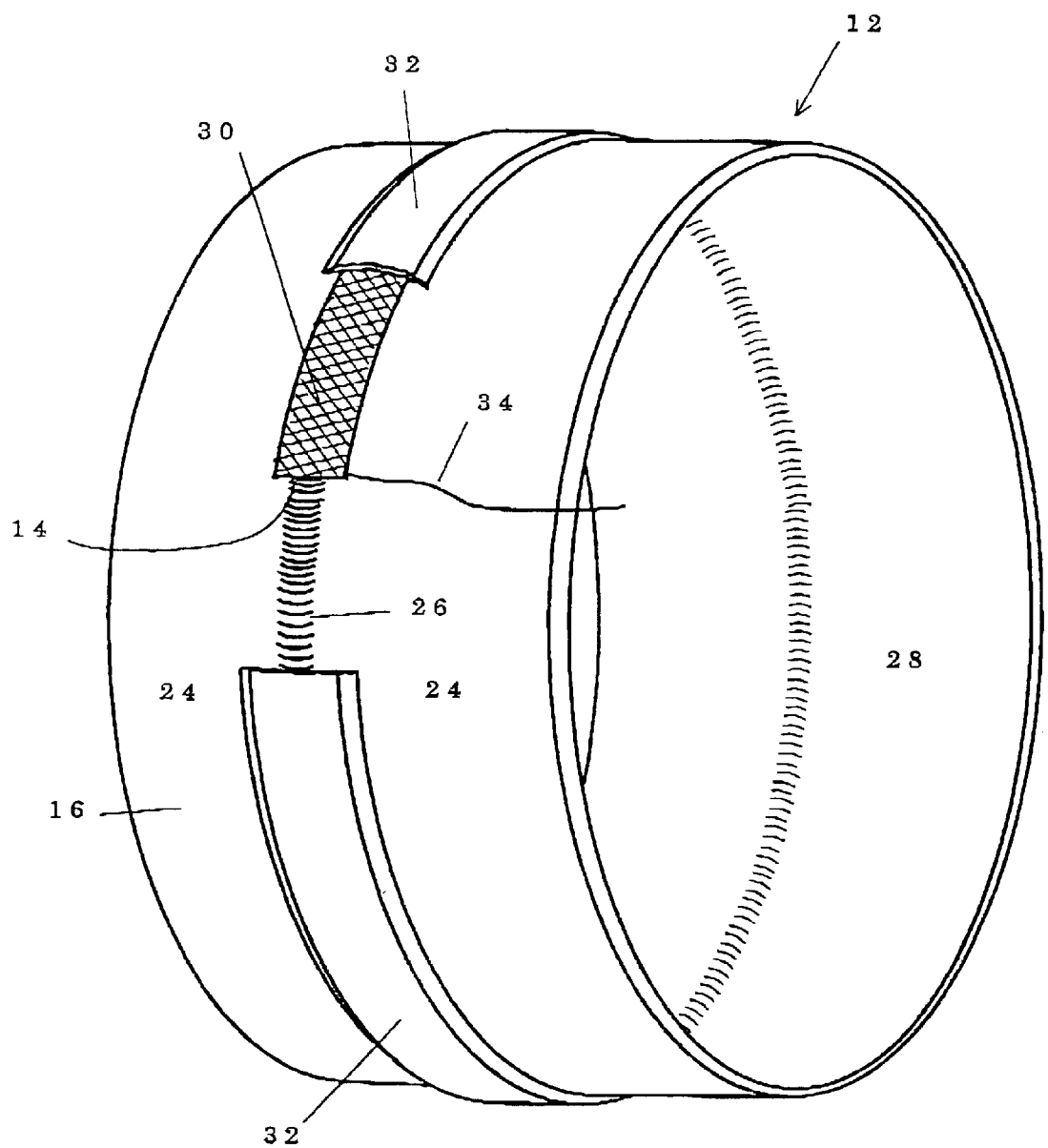
FIG. 3 is a schematic representation of a partially sectioned view of a portion of a pipeline to which is attached a sensor cavity incorporated in an embodiment of the present invention.

Referring to the accompanying drawings and in particular FIGS. 1–3, an embodiment of the system 10 for condition monitoring of a structure such as a welded pipeline 12 includes a plurality of substantially sealed first cavities 14 formed on outer circumferential surface 16 of the pipeline 12 and a fluid source 18 at substantially constant sub-atmospheric pressure (which may include a vacuum), coupled to the cavities 14 through respective high fluid impedance devices 20 which create pressure differentials between the source 18 and the cavities 14. The system 10 further includes a telemetry system 22 operatively associated with the high impedance devices 20 which monitor for any change in pressure differential across each high impedance 20 and, when a change is monitored, provides a signal indicative of the location of the cavity associated with the high impedance device across which the pressure differential is monitored.

The pipeline 12 is made from a plurality of pipes 24 which are joined end to end by respective circumferential or girth welds 26 (see in particular FIG. 3). The cavities 14 are formed over the welds 26. In the illustrated embodiments, the cavities 14 are formed on the outer circumferential surface 16 of the pipeline 12 but can alternatively, or in addition, be formed about the welds 26 on the inner circumferential surface 28 of the pipeline 12.

As shown most clearly in FIG. 3, each cavity 14 includes a band of fluid permeable material 30 extending about and on the weld 26 and an overlying band of sealant material 32. The sealant band 32 wholly covers the permeable band 30 forming a seal wholly about the band 30 on to the surface 16 of the pipeline 12. Thus the cavity 14 exists between the band 32 and the weld 26 by virtue of the intervening fluid permeable band 30. A duct 34 is placed in fluid communication with the cavity 14. Typically this would be done by placing a proximal end of duct 34 under the band 30 prior to application of the band 32. Fluid pressure in the cavity 14 can be effected by coupling the duct 34 to a pressure source. Further, any through crack in the weld 26 can influence (i.e. change) fluid pressure within the cavity 14 which in turn can be detected by virtue of communication with a sensor or monitor via the duct 34.

Referring to FIG. 1, a duct 36 extends from said source 18 essentially for the length of the pipeline 12 and is in fluid communication with one end of each high impedance 20. As an enhancement to monitoring integrity, the duct 36 is coupled to the source 18 via a fluid detector 38 which is arranged to detect one or more target fluids that would normally flow through the pipeline such as a hydrocarbon liquid or gas.

The duct 36 is also coupled via respective ducts 40 to a first input of respective pressure differential switches 42. An end of each impedance 20 distant from the duct 36 is placed in fluid communication with respective cavities 14 via the ducts 34. The ducts 34 are also in fluid communication with a second input of respective switches 42. Thus, in effect, the switches 42 are coupled across respective high impedances 20. The high impedances 20 can take various different forms including long fine ducts, permeable membranes, sintered glass elements, micro orifices or the like. The magnitude of the fluid impedance is designed to be sufficient to accommodate known gaseous diffusion or anticipated fluid flow due to the permeability of the material defining the cavity without causing too significant a pressure differential across the high impedance connection but is sufficiently high as to produce a detectable pressure differential across the connection in response to a change in the vacuum condition caused by increased fluid flow into the said cavity.

The switches 42 form part of the telemetry system 22. The telemetry system includes a signal communication path, constituted, in this embodiment by transmission lines or wires 44, 46, which carry signals to and from the switches 42. Further, the switches 42 are coupled in parallel with each other across the transmission lines 44 and 46. More particularly, one terminal 48 of each switch 42 is coupled to transmission line 44 via respective parallel combinations of a resonant trap or band pass filter 50 and a choke 52. The resonant trap or band pass filters 50 are tuned to different frequencies to allow for individual polling of the switches 42 as will be explained in greater detail below. The chokes 52 are arranged to allow passage of a DC current only. An opposite terminal 54 of each switch 42 is connected with the other transmission line 46.

A fluid source pressure monitor switch 56 is coupled between the transmission lines 44 and 46, and more particularly coupled in series with the transmission lines 44 and 46 at their most distant end via a parallel combination of resonant trap or band pass filters 50 and choke 52. The purpose of these components will become apparent in the description of the testing procedure to follow. The switch 56 has a first input 58 in fluid communication with the source 18 via the duct 36 and contiguous duct 60. Switch 56 also includes a second input 62 that is vented to the atmosphere which is at a pressure substantially different (and in this case higher) than of the source 18. Switch 56 is arranged so as to be in an open state when there is a substantial difference in pressures presented at the first and second inputs 58 and 62. This would be the case when the source 18 is in fluid communication with the port 58 via the ducts 36 and 60. However, the contacts on the switch 56 close when there is no significant differential pressure between the first and second ports 58 and 62. A resistor 64 and choke 66 are coupled in series with each other but in parallel with the switch 56 between the transmission lines 44 and 46. When the switch 56 is in the open state the resistor 64 and choke 66 provide a high resistance path to a DC signal between transmission lines 44 and 46 for circuit integrity assurance. However, when the switch 56 is closed, this high resistance path is effectively short circuited by the switch 56. The switch 56 would move or change to the closed state when there is no vacuum present at the input port 58 so that the pressure at port 58 is or approaches atmospheric pressure. The short circuit provided by the closed switch 56 could easily be detected by resistance measurements between the transmission lines 44 and 46 providing an indication of a failure or disconnection of the vacuum source 18.

The telemetry system 10 further includes a two position master switch 68. As explained in greater detail below, when the switch 68 is in position A, the system 10 provides continuous condition monitoring for the detection of a crack or fault in the welds 26 of the pipeline 12 and, a monitoring of the source 18 and general vacuum system integrity. When the switch 68 in position B the system 10 operates to indicates the location of the weld 26 in which a fault has been detected and also allows for periodic condition monitoring of each of the components of the system other than the vacuum system.

The telemetry system 10 further includes a DC power supply 70 providing a DC current to the transmission lines 44 and 46; an AC signal generator 72 for providing a range of AC signals such as RF or ultra sonic signals that can also be applied to the transmission lines 44 and 46; and a combined current sensor and alarm 74 which is connected in the transmission line 44.

The operation of the system can now be described.

Under normal operating conditions, a steady state subatmospheric pressure (i.e. vacuum) exists in each cavity 14 by virtue of the coupling of each cavity 14 with the source 18 via respective high impedances 20 and the duct 36. The actual pressure in each cavity 14 will be slightly higher than that in the duct 36 due to permeability leakage into the cavities 14 and the impedance of the high impedance devices 20. The switches 42 are adjusted to be normally open, as shown in FIG. 1, under this stable, near balanced vacuum condition. On the other hand, the pressure monitor switch 56, which has its input 62 vented to the atmosphere is subject to the large pressure differential between the sub-atmospheric pressure source 18 and the atmosphere. Thus the switch 56 is effectively an open circuit with the resistor 64 and choke 66 providing a high resistance path for DC current provided by the DC source 70. The choke 66 of course blocks the passage of any RF or ultra sonic signal or AC current and may, by itself, have sufficient DC resistance to represent resistor 64.

With the switch 68 moved to position A the transmission lines 44 and 46 are coupled to the DC source 70. The current sensor 74 monitors current flow which is limited, and indeed determined, by the resistance 66 and choke 64 across the switch 56. If there is no fault detected in the welds 26, the switches 42 remain in their open state, thus the current flow or current drawn from the DC source 72 will be largely determined by resistance 64 and choke 66. Provided the sensor 74 senses that the current is within a predetermined range of this known value, the detector 74 does not raise any alarm indicating that there is continuity in the circuit comprising the transmission lines 44 and 46 and that there is no detectable fault or crack in the welds 26. This can also be indicated by means of a visual indicator (not shown) which may be associated with the detector 74.

In this state, if vacuum is lost in the vacuum duct 36, for example by failure of the vacuum source 18, the switch 56 will close, thereby short circuiting the resistor 64 and choke 66. This will produce a change in the current drawn from the DC source 70 which in turn will be detected by the detector 74 setting off an incorporated alarm. Alternatively, a break in the transmission lines 44 and 46 will initiate an alarm.

Assume now, that the source 18 and the entire vacuum (i.e. fluid) system is fully operational and the switch 68 remains in position A so the system 10 is in the condition monitoring mode. If a through crack were to develop in a weld under the cavity 14 in the center section of the pipeline 16 depicted in FIG. 1, there would be a change in the vacuum condition in the cavity 14 by reason of a vacuum leak through the crack. This is communicated via duct 34 to the switch 42 as a change in the pressure differential across the high impedance 20. Accordingly, the corresponding switch 42 will switch to the closed state as indicated by the contact C depicted in phantom in FIG. 1. It will be appreciated that when the switch is closed a DC signal current from the source 70 now has a return path from transmission line 44 through the choke 52 associated with the now closed switch 42 back through the line 46. This will result in a known change in the current drawn from the DC source 70 which will be detected by the detector 74 enabling the issuing of an alarm (audible, visual or both).

To locate the cracked weld 26 that has given rise to the alarm condition the switch 68 is then moved to position B connecting the transmission lines 44 and 46 to the signal generator 72. The signal generator 72 provides, as an output, multiple signals of different frequencies. Individual resonant traps/band pass filters 50 are tuned to a specific frequency but block the passage of signals of different frequencies. Therefore in the above example, the particular frequency to which the resonant trap 50 associated with this central switch 42 shown in FIG. 2 is tuned is able to travel along transmission line 44, through that particular resonant trap 50 and associated switch 42 and back along line 46. This frequency can then be detected on line 46. As this frequency is unique it provides an indication that the faulty weld is under the cavity 14 associated with the central switch 42. Similarly, if the switch 56 closes, its particular frequency will be detected.

As a backup, the analyser 38 is able to detect various gases which would be drawn into the vacuum line 46 through the cracked weld 26. The analyser 38 provides confirmation of the existence of a fault in a particular weld 26 or indeed failure of a cavity 14.

In preparation for testing of the whole system 10 and before switching the switch 68 to position B, the subatmospheric pressure source 18 is disconnected from the sub-atmospheric pressure duct 36 allowing the pressure in the duct 36 to rise causing the pressure monitor switch 56 to close resulting in the detector 74 raising an alarm to show the change in current from the DC source 70. This simulates detection of a sub-atmospheric pressure failure and confirms the integrity of the switch 56 and continuity of the fluid communication between its port 62 and the atmosphere.

Figure 4:
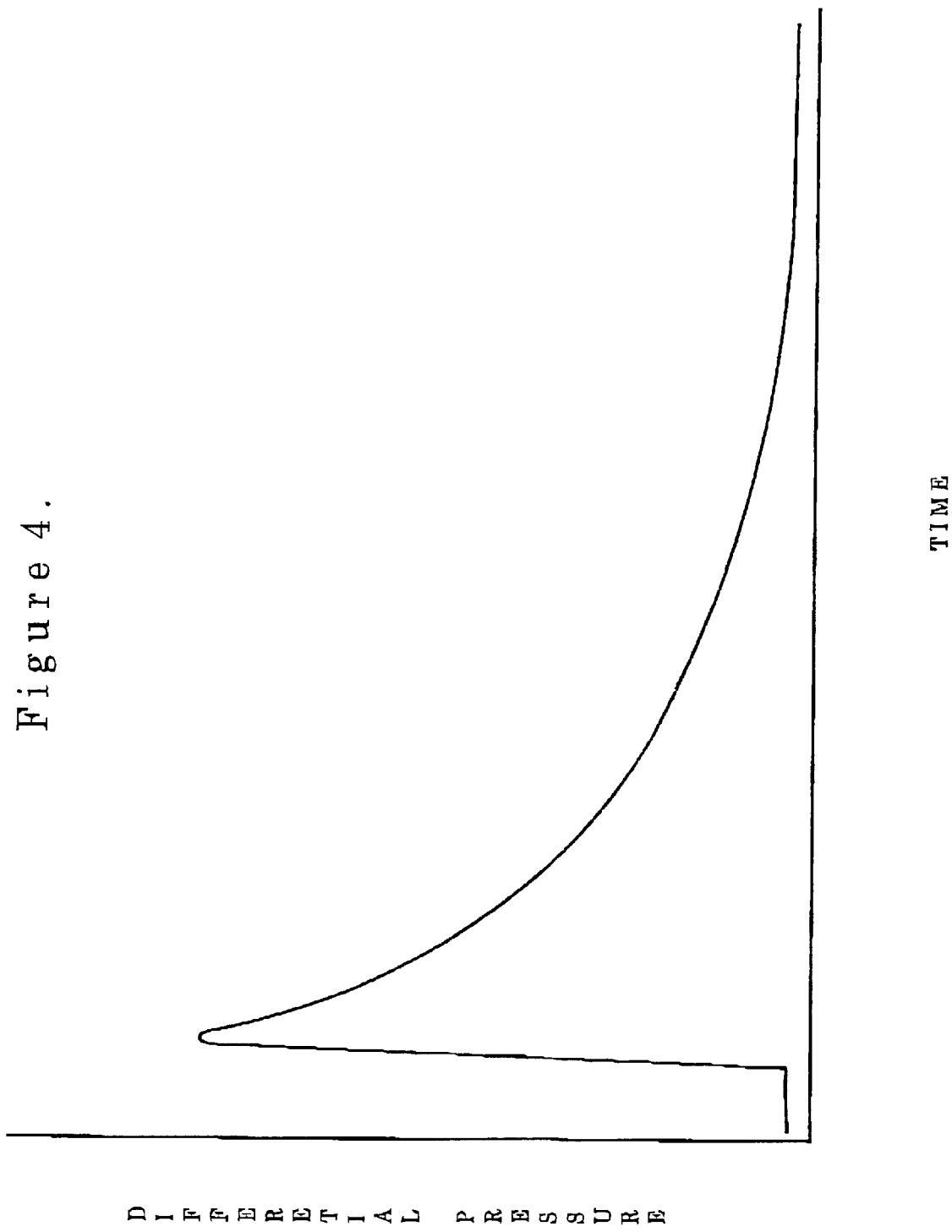
FIG. 4 is a graph depicting change in differential pressure across a switch incorporated in an embodiment of the present invention as a function of time.

The integrity of other components of the system 10 can also be tested by relying on the inherent characteristics of a fluid capacitance connected to the high impedance devices 20 as explained below. In this example the fluid capacitance is provided by the elastic behaviour of a volume of gas and the finite volume defined by the cavities 14 and associated componentry. Consider one sub assembly constituted by a particular switch 42; the associated ducts 40, 34; the length of duct 36 between the associated duct 40 and vacuum source 18; and cavity 14. Assume the duct 34 is fluidly isolated from the cavity 14 and switch 42 so that it defines, by itself, a cavity or volume and that the pressure within the duct 34 is at ambient atmospheric pressure. If the remainder of the sub assembly is under sub-atmospheric pressure condition and is suddenly connected to the duct 34 there will be a sudden rise in differential pressure across the high impedance 20 and the switch 42 due to the volume of the fluid at atmospheric pressure contained within the duct 34. The differential pressure rises to a peak value and then slowly bleeds away through the high impedance 20 until it falls to a steady state low pressure differential as determined by the impedance of the high impedance device 20 and permeability of the cavity 14. FIG. 4 illustrates graphically the differential pressure against time across the high impedance 20 in this situation. The area of the curve varies directly with the magnitude of the volume, in this case, the volume of the duct 34. The switch 42 temporarily closes its contacts in response to the transient pressure rise. This capacitance characteristic can be exploited in embodiments of the invention.

A similar switching action of each of the switches 42 occurs if the whole system 10 is first exposed to ambient pressure and then the vacuum source 18 suddenly applied to the duct 36. Pressure falls progressively along the duct 34 toward the switch 56 in a travelling pressure gradient to the end of the duct 36. This causes the momentary closing then opening of each of the differential pressure switches 42 progressively along this system as each cavity 14 and duct 36 is evacuated. As the total volume of the cavities 14 and ducts 34 effect the switching time interval, a measure of integrity is indicated as well as that of each associated sub assembly comprising duct 40, high impedance 20, duct 34 and associated switch 42. The sizing of the vacuum duct 36 and the number of welds 26 all influence this behavior. The length of the system 10, more particularly the length of pipeline 20 that can be used to exploit the transition pressure change effect is limited by the rate of change of pressure at the remote end of the duct 36. A further dedicated volumetric capacitance at the end of vacuum duct 36 can also influence this behaviour. The switch 68 is placed in position B for the integrity testing operation. The purpose of selective trap and choke arrangement associated with switch 56 will now be apparent to prevent shorting of the entire frequency range during the above integrity test.

FIG. 2 depicts the installation of various components of the system 10 on the outer surface 16 of a portion of the pipeline 12. The high impedance 20 is in the form of a long length of fine tubing wound into a coil coupled across the ports of differential pressure switch 42. One end of the impedance 20 is also in fluid communication with the cavity 14 via duct 34. Transmission line 44 is coupled to the switch 42 via a sealed capsule 76 which houses the resonant trap 50 and choke 52. Telemetry transmission line 46 is coupled directly to the other terminal of switch 42. The whole assembly can be encapsulated and sealed to the pipeline 12.

Figure 5:
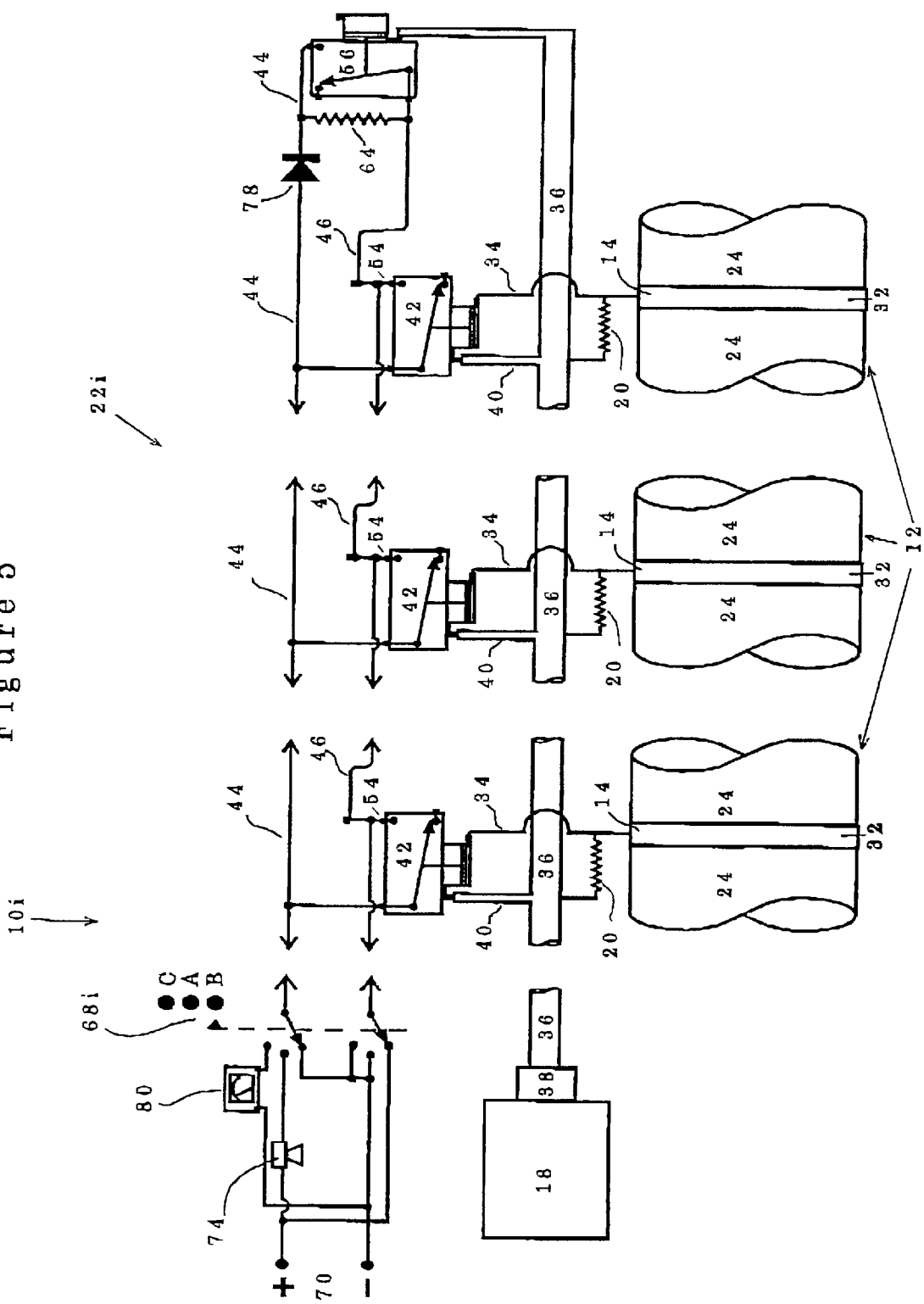
FIG. 5 is a schematic representation of a second embodiment of the present invention.

FIG. 5 illustrates an alternate embodiment of the system $10i$ where the telemetry system $22i$ uses only a DC supply 70 for determining the existence and location of a fault. In this embodiment, items and features which are identical to those of the first embodiment are denoted by like reference numbers while those with similar features but bearing some modification are indicated by the same reference number with the addition of a (i). The telemetry system $22i$ differs from the system 22 by deletion of the resonant traps 50 and chokes 52, deletion of the choke 66; inclusion of a series connected diode 78 in the transmission line 44 and replacement of the two-position switch 68 with a three position switch $68i$.

When the switch $68i$ is in position A, the monitoring function of the system 10 is essentially similar to that depicted in FIG. 1 with the switch 68 in position A. The resistor 64 provides a high resistance path between the transmission lines 44 and 46 determining the current drawn from the DC supply 70 which is monitored by the current monitor 74. The changing of state of either of switches 42 or of the switch 56 provides a detectable change in the current drawn from the DC source 70 which will be detected by the monitor 74 to provide an alarm indication.

To provide testing of the integrity of the system 10, the switch $68i$ is moved to position B which in effect reverses the polarity on transmission lines 44 and 46 and also resulting in the fluid source pressure master switch 56 and resistor 64 being isolated due to the reverse biased diode 78. The differential pressure switches 42 are still able to produce transient pulses resulting in their temporary change in state to provide a detectable change in current draw when the sub-atmospheric pressure is dissipated and suddenly reinstated.

As mentioned above, when the switch $68i$ is in position A, the system 10 is in a monitoring state. If one of the switches 42 changes state indicating a through crack formed in a weld 26, the location of the particular switch and thus the corresponding weld can be determined by switching the switch $68i$ to position C. In this position, a meter 80 is used to measure the resistance of the circuit formed by the length of the transmission line 44 to the particular switch which has changed state, and the length of the transmission line 46 from that switch back to the DC source 70. It is envisaged however that system $10i$ may be practical only with a low number of switches 42.

Figure 6:
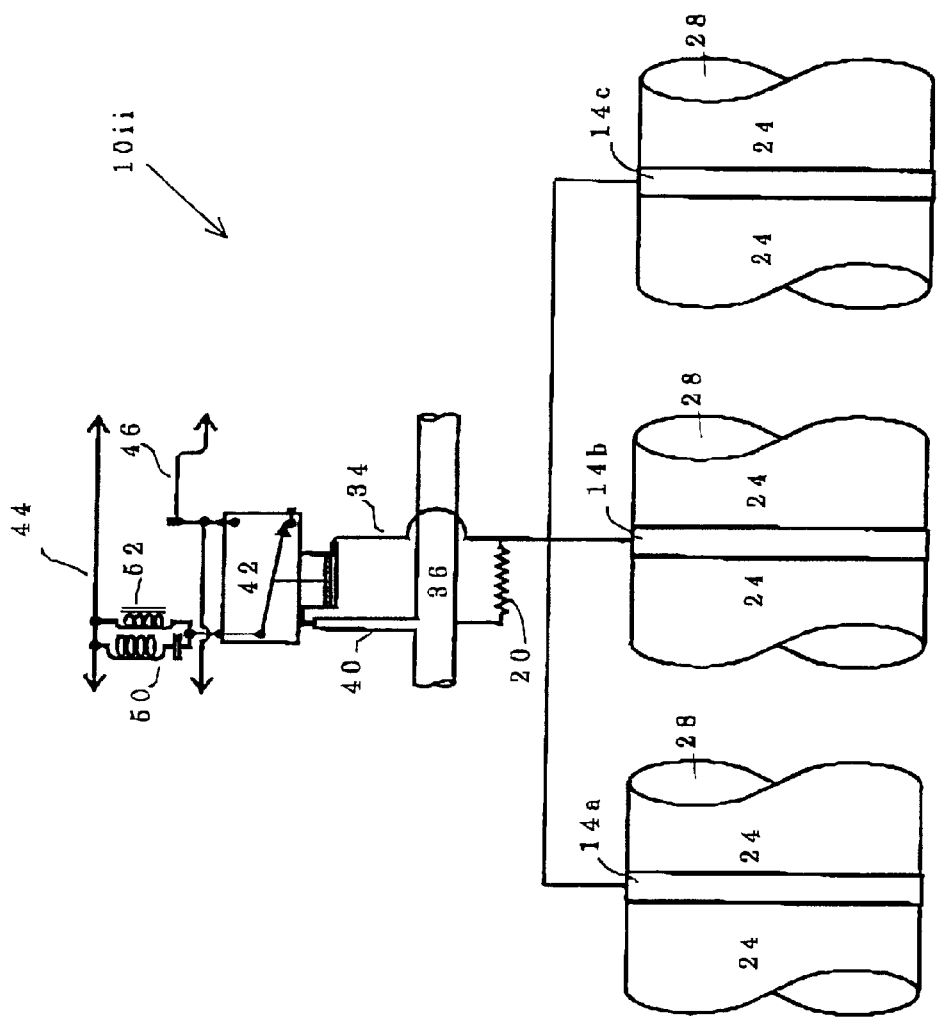
FIG. 6 is a schematic representation of a third embodiment of the present invention.

FIG. 6 illustrates a further embodiment of the system $10ii$ wherein the welds 26 under a set of three cavities $14a$, $14b$ and $14c$ are monitored simultaneously by the one switch 42 and corresponding single high impedance device 20. In all other respects the system $10ii$ is the same as a system 10 depicted in FIG. 2. A benefit of the system $10ii$ is lower capital and installation costs. The tradeoff however is that there is less precision in the determination of the location of a faulty weld as a fault could exist under any one of the three separate cavities $14a$, $14b$ and $14c$.

Figure 7:
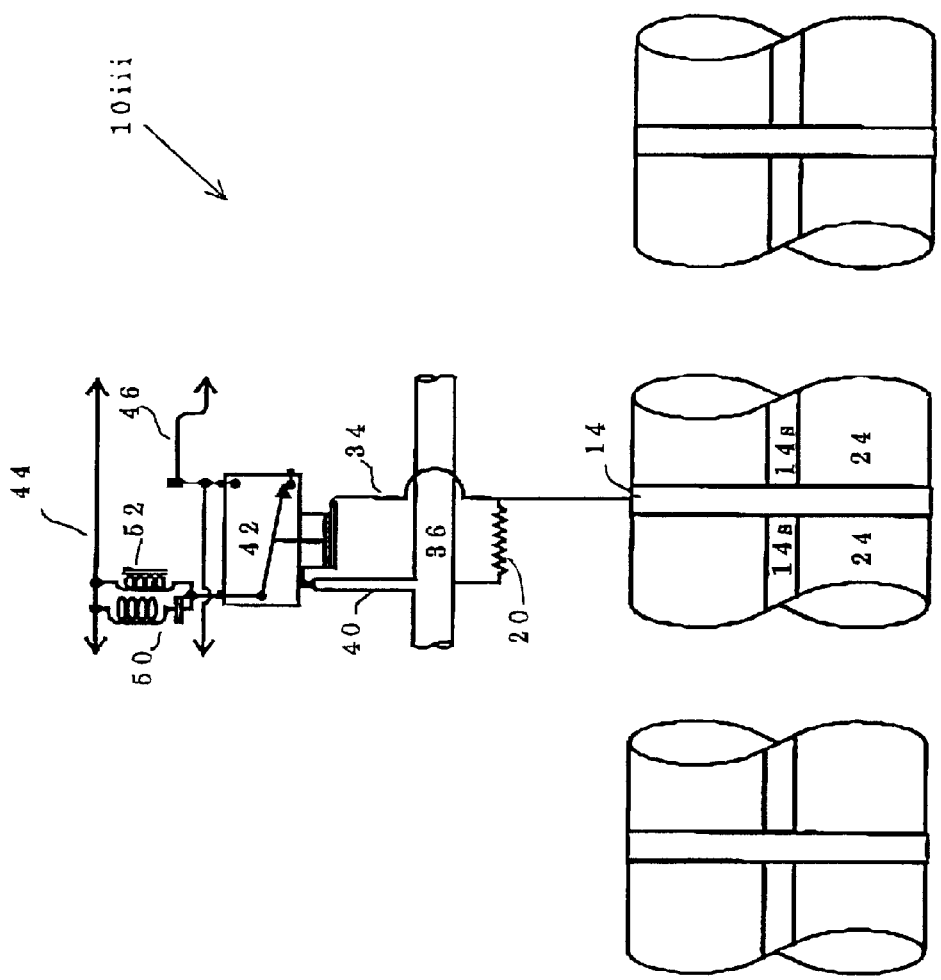
FIG. 7 is a schematic representation of a fourth embodiment of the present invention.

FIG. 7 depicts yet a further embodiment in which the system $10iii$ differs from the system 10 depicted in FIG. 1 only by configuration of the cavity 14 which now includes a transverse portion 14S for covering a seam weld in a pipe 24.

In the above described embodiments, the substantially constant pressure source is a sub-atmospheric pressure or vacuum and the pipeline 12 would typically be disposed near ground level, in which case the reference pressure for switch 56 would be the ambient air pressure. However in further embodiments of the invention instead of a gas sub-atmospheric pressure differential pressure being monitored, a liquid differential pressure can be monitored. Such an embodiment would be particularly useful when the welded structure is a pipeline disposed in a body of water such as the ocean, as would be the case with, for example, a steel catenary riser.

FIGS. 8–12 depict an embodiment of the present invention in which the pressure source is a liquid source and the pressure differential measured is a differential liquid pressure. In a further departure from the previous described embodiments, the embodiment depicted in FIGS. 8–12, detects surface cracks rather than through cracks. Although, as described in greater detail below, irrespective of whether the pressure source is a liquid or a gas, embodiments of the system 10 can be arranged to detect either or both through cracks or surface cracks in the welds 26.

Figure 8:
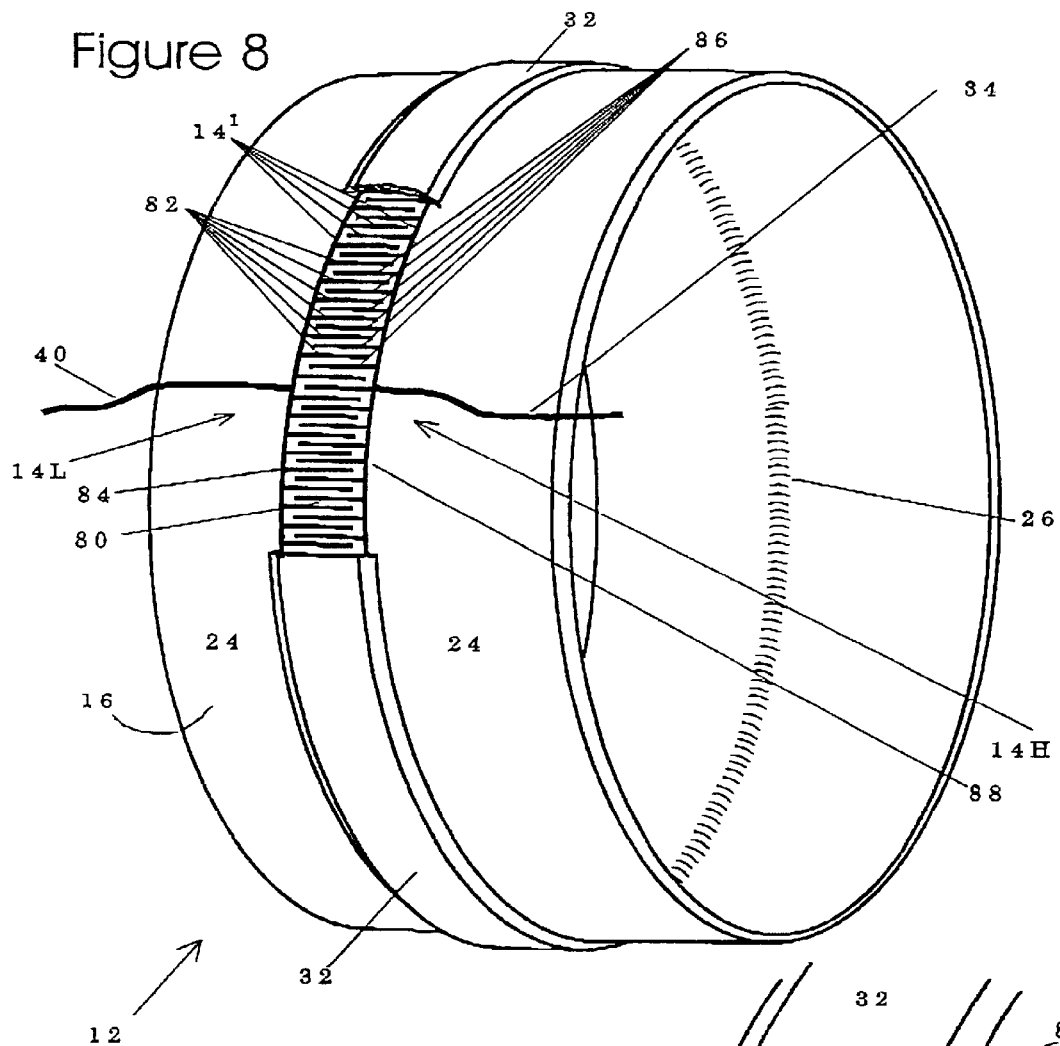
FIG. 8 is a representation of a second embodiment of a sensor cavity incorporated in the present invention.
Figure 8A:
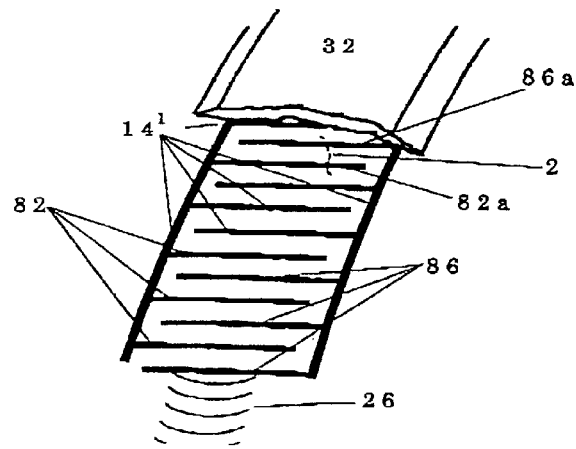
FIG. 8a is a representation of enlarged portion of FIG. 8.

FIGS. 8 and 8*a* depict an alternate cavity structure 141 formed about the weld 26 between adjacent sections of pipe 24 in a pipeline 12. In this embodiment, the cavity 14 is composed of two of sub cavity assemblies 14L and 14H. Typically the sub assemblies 14L and 14H may be formed in a single elongated strip 80 of elastomeric material having an under surface sealed on to the outer surface 16 of the pipeline 12 about the weld 26. The sub assembly 14L is in the form of a plurality of transverse extending spaced apart grooves 82 formed in the strip 80 which are open on their surface adjacent the weld 26 and are in fluid communication at one end with a common feed channel 84 which in turn communicates with a duct 40 connected to a reference supply duct 36 shown in FIGS. 9, 10 and 11. The sub assembly 14H is of identical construction to the sub assembly 14L having a plurality of transversely extending grooves 86 which are open on the surface adjacent the weld 26 and each of which communicates with a common feed channel 88 which is in fluid communication with the duct 34. The sub assemblies 14L and 14H are arranged so that their respective grooves 82 and 86 are interspersed. A layer of sealant material 32 overlies the strip 80 and seals it to the pipeline 12. Further protective covering can be provided in deep sea application.

Figure 10:
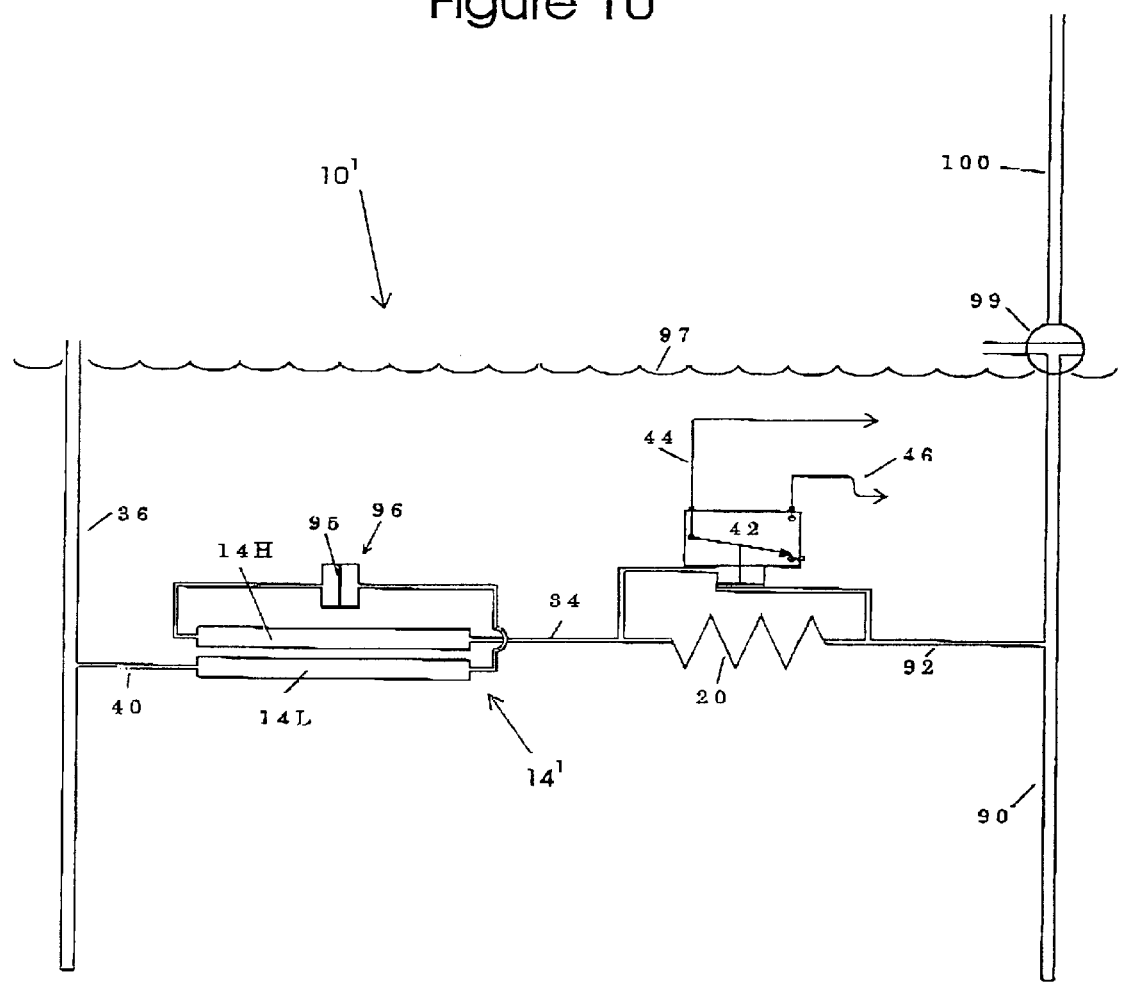
FIG. 10 illustrates the embodiment shown in FIG. 9 but in a different state; and, FIG. 11 illustrates the embodiment shown in FIG. 9 in a transitional state.
Figure 11:
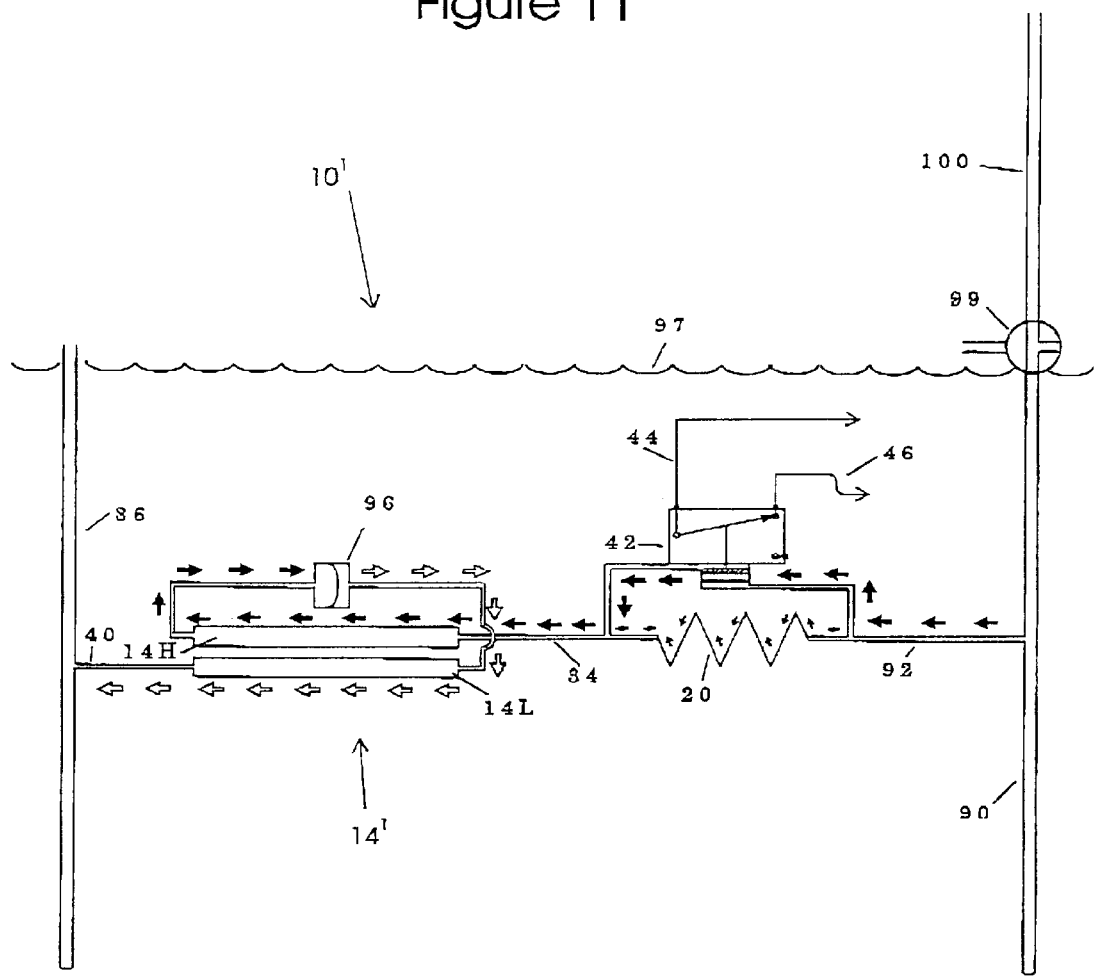
Figure 12:
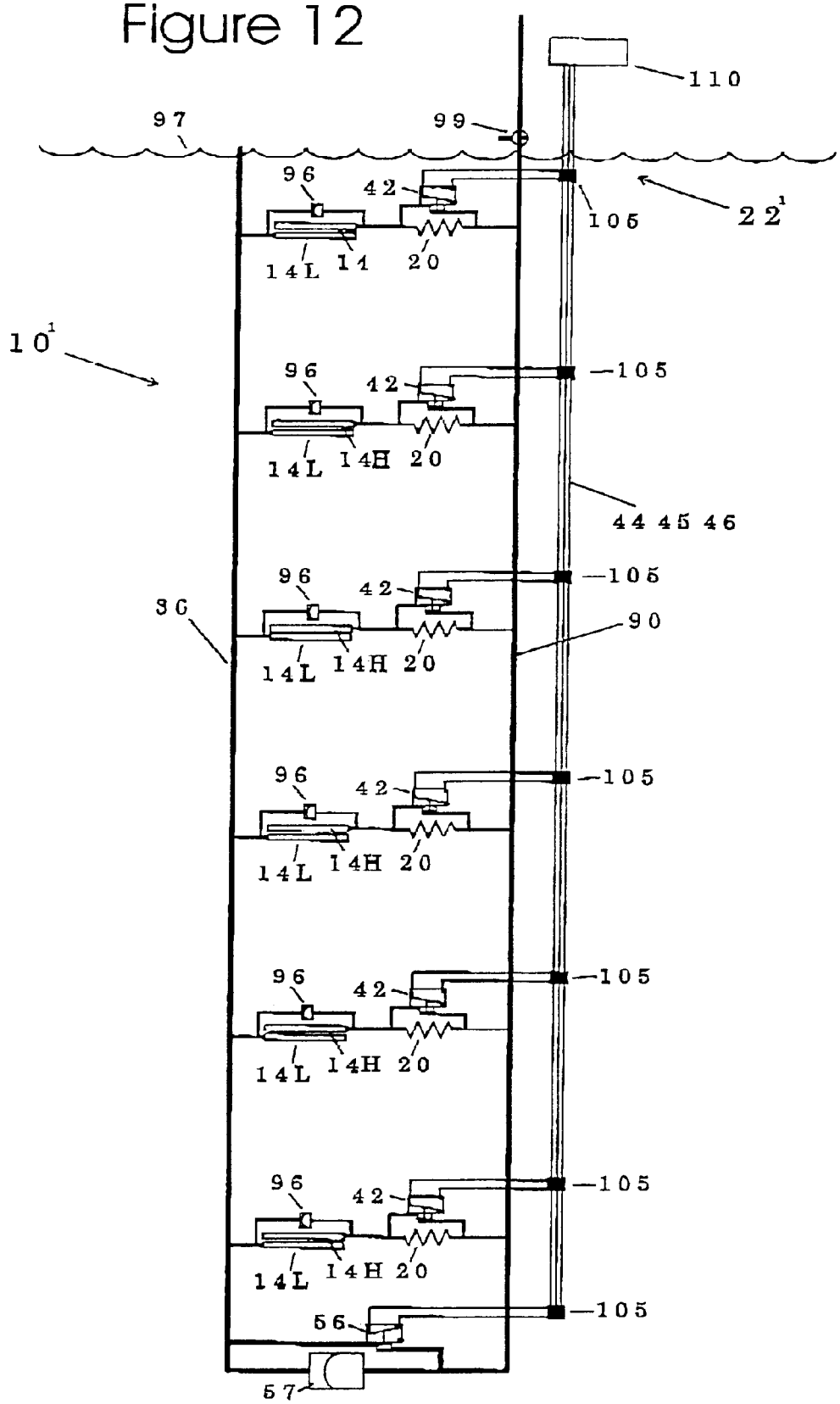
FIG. 12 is a representation of a plurality of the embodiment depicted in FIG. 9 together with a telemetry system; and, FIGS. 13a, 13b and 13c show a further embodiment of the present invention.

FIGS. 9, 10, 11 and 12 show substantial emersion of the system 101 below an ocean surface 97. Accordingly the sub cavities 14L contain a liquid, preferably non-corrosive, with its surface minimally above the ocean surface hence having a reference pressure that is substantially the same as the water pressure at the depth of the pipeline 12. To this end, the duct 36 would in effect act as a tube supporting a column of water equal to the depth of the pipeline 12. Thus the column of water within the duct 36 would become the reference fluid source. If the need for corrosion protection did not exist, duct 36 could be removed and sea water could be the reference fluid. The fluid source is coupled via duct 40 to the cavities defined by the sub assembly 14L. The system 101 further includes a high-pressure reference in the form of a duct 90 containing liquid, (preferably non-corrosive), at a pressure higher than that in the duct 36. This is achieved by forming the duct 90 to have an additional length 100 above the duct 36 containing liquid. An atmospheric vent valve 99 is placed in the junction of the ducts 90 and 100 so that when opened, the additional column length 100 above the head of duct 36 is isolated and the pressure in ducts 36 and 90 can be equalised. High impedance 20 is coupled to the duct 90 via a feed duct 92 and the sub assembly 14H is in turn coupled in series with the high impedance 20 via duct 34. Pressure differential switch 42 is coupled across the high impedance 20 as in the previous embodiments. The system 101 further includes a fluid capacitance for transient flow of a fluid in the form of a pressure variable volume or simulated capacitance 96 coupled across the sub assemblies 14L and 14H. Fluid communication could be configured as a parallel arrangement, (as shown in FIG. 12) but is shown in a series arrangement, in FIGS. 9, 10, and 11, to give assurance of the continuity of the common feed channels 84 and 88, of FIGS. 8 and 8*a*, to enhance integrity monitoring and fail safety.

As previously described a fluid capacitance for transient flow of a fluid or equivalent capacitance is inherent in the system described in FIGS. 1–7 by virtue of the inherent compressibility of gases. However in the system 101, a pressure variable volume or simulated capacitance 96 is specifically added, providing a capacitive means for transient flow of a fluid because of the incompressibility of the liquid used as the pressure source.

The pressure variable volume must behave elastically. To this end, the said volume is separated into two sub volumes by an elastic membrane or diaphragm, spring-loaded piston arrangement, or similar device. FIG. 9 shows an elastic diaphragm 95 contained within the pressure variable volume or simulated capacitance 96. The distinct curvature of the diaphragm illustrates the effect of strain induced by the difference in pressure between the two sub volumes 94 (higher pressure) and 93 (lower pressure) due to the different pressure between ducts 90 and 36.

The pressure differential switch 42 changes state on the basis of a change in pressure differential across the high impedance 20 in response to a fluid flow through the impedance 20 into and out of the sub volumes 93 and 94. Note that the pressure variable volume or simulated capacitance 96 is fluidly communicated via the cavities 14H and 141 for additional integrity monitoring of the said cavities.

In a steady state condition, there will be insignificant pressure differential across the high impedance 20, dependent on containment material permeability. The switch 42 is set to one state (typically an open state) in this condition. Consider now the situation where a surface crack 2, shown in phantom, would develop in the weld 26 between the grooves 82*a* and sub assembly 14L and groove 86*a* in sub assembly 14H FIG. 8*a*. When the surface crack 2 propagates to a length so that it forms a communication path between both grooves 82*a* and 86*a* there will be a miniscule flow of liquid from groove 86*a* to the groove 82*a*. This will cause a variation in the pressure differential across the high impedance 20 which will be detected by the switch 42 causing it to change state. By use of telemetry systems similar to those described in the above embodiment, the change of state of the switch 42 can be used to activate an alarm signaling the existence of a crack or other fault in the welds 26. Similarly, the telemetry system can be used to locate the particular switch 42 that has changed state and therefore give an indication of the location of the weld 26 in question.

In order to detect a through crack in the weld 26, one of the sub assemblies 14L or 14H can be placed on the inner circumferential surface of the pipe 12 whilst the other remains on the outer surface. Alternately, surface cracks on the inside of the pipeline 12 can be detected by moving the whole of the cavity assembly 141 to the inside surface of the pipeline 12. In yet a further variation, cavity structures 141 containing both sub assemblies 14L and 14H can be disposed on both the inner and outer circumferential surfaces of the pipeline 12 about the weld 26.

Figure 13A:
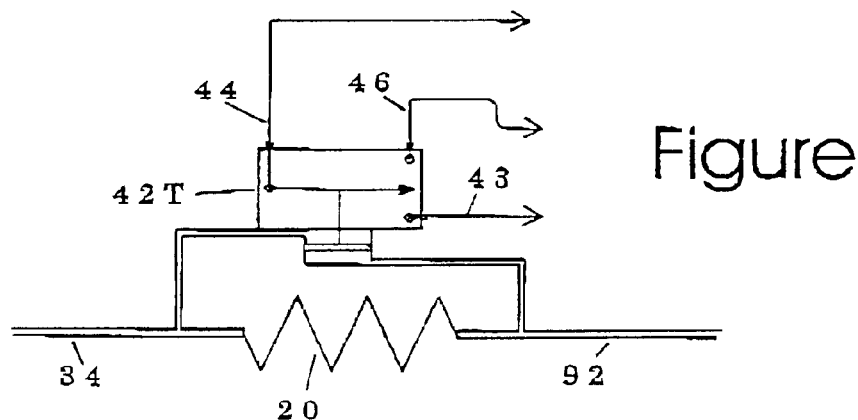
Figure 13B:
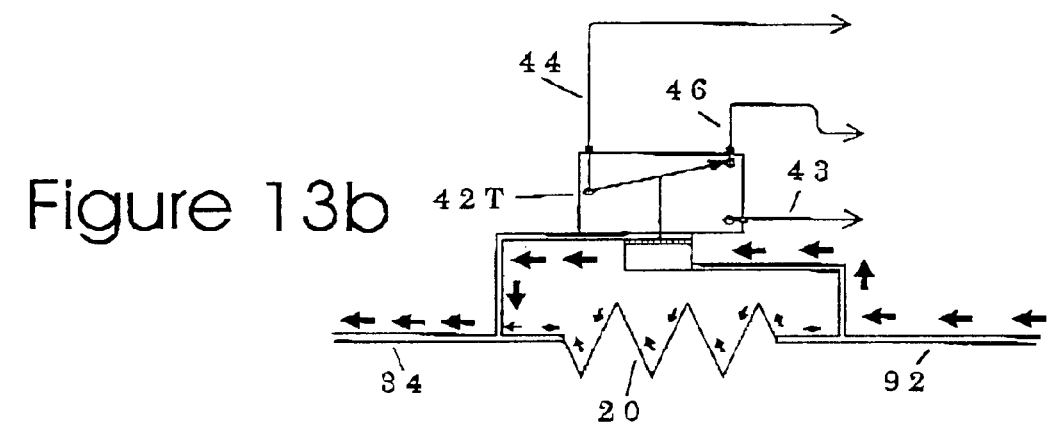
Figure 13C:
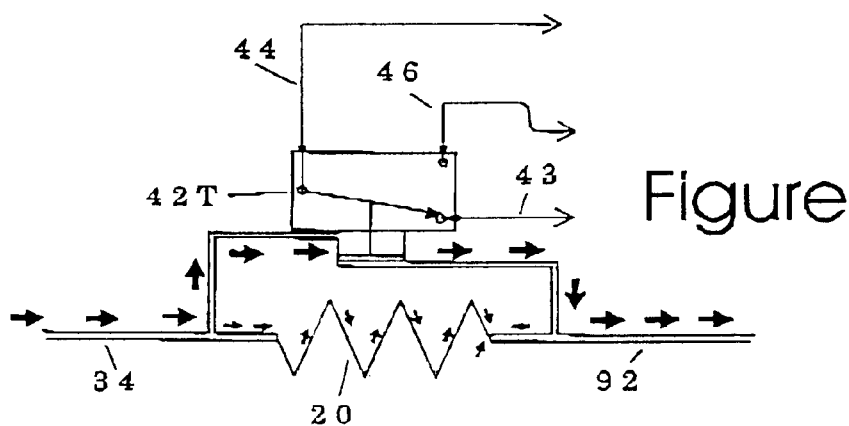

In yet another configuration, the sensor cavity arrangement can be made similar to that illustrated in FIG. 3 for through cracking. In a further configuration, a three position differential switch can be employed to signal both negative and positive change from a stable pressure condition with flow in either direction through high impedance 20 is shown in FIGS. 13a, 13b and 13c.

The pressure variable volume or simulated capacitance 96 introduces a time constant characteristic in the flow of liquid through the system 101 similar to that depicted in FIG. 4 which is used in testing the integrity of the system 101. Any momentary change in pressure differential causes an alteration in the relative volumes of the high and low pressure liquids within the pressure variable volume or simulated capacitance 96 causing a flow through the high impedance 20 resulting in the switch 42 momentarily changing state.

As previously described the pressure variable volume or simulated capacitance 96 typically includes an elastic compartment dividing diaphragm 95 or similar arrangement to restore a neutral configuration with no pressure differential applied.

In order to test the integrity of the system 101, the valve 99 is opened to atmosphere to isolate the line 92 from the additional pressure head and to equalise the pressure of liquid within both ducts 90 and 36. As such, there is no pressure differential across the high impedance 20 or diaphragm 95. This situation is depicted in FIG. 10. Once the pressure has been equalised throughout the system 101, the valve 92 is again switched so as to re-establish the pressure head in duct 90 and thus introduce a pressure differential between ducts 90 and 36. The pressure variable volume or simulated capacitance 96 will allow a small flow of liquid through the ducts 90 and 92, high impedance 20 and duct 34, illustrated by a series of black arrows (the displaced fluid from capacitance 96 is shown with white arrows). This produces a pressure drop sufficient to activate the pressure differential switch 42 (FIG. 11). This will then activate an alarm thus providing an indication of the integrity of the system 101. A degree of sequential switch can be achieved by placing at the remote end of duct 90 a variable volume 57 shown in FIG. 12 to produce a transient pressure gradient along the duct 90.

FIG. 12 shows in schematic form, the layout of the system 101 with the switches 42 coupled to the telemetry system 221 via conductors/transmission lines 44, 46 and additional line 45. As previously mentioned, rather than using analogue electronics, e.g. swept frequency signals, and resonant traps/band pass filters, the telemetry system 221 can rely on digital electronics with for example transponders 105 and a computer 110 for communications to poll the switches 42 in the event of the detection of an alarm.

It will be noted that in FIG. 12 the pressure variable volume or simulated capacitance 96 is coupled across the sub assemblies 14L and 14H in a parallel configuration, as an alternate example.

FIGS. 13a, 13b, 13c show three states of a three-position switch applied to a further embodiment.

The switch 42T is shown at rest in FIG. 13a with responses to both positive flow (FIG. 13b) and negative flow (FIG. 13c) through the high impedance 20. An additional transmission line 43 is shown to facilitate telemetry provision with this embodiment. It will be apparent that the use of this type of switch with either system 10 or 101 allows system testing upon removal of system pressure differential as well as during the reinstatement as previously proffered as examples.

All of the previously disclosed systems can be automatically cycled on a predetermined time basis.

Where access is severely limited such as in closed vessels like waste tanks on submarines, fully self-contained systems can be employed using ultrasonic data transmission or the like through the containment wall to achieve true remote systems. For example, a simple one-cavity system could be activated with the application of differential fluid pressure in the form of a single pulse of a 15 second duration on a 24 hr basis to minimise stored energy in order to extend endurance.

Transmission of an ultrasonic signal activated from an alarm set at a predetermined level could convey status of the system in the following manner:

A 6 second ultrasonic pulse would indicate charge up and stabilising of the system and hence assurance of integrity of the system;

A 15 second ultrasonic pulse would indicate a flaw has been detected in either the system or the structure.

Further, it will be apparent that the disclosure of the relationship of the shape of the pressure differential Vs time curve illustrated in FIG. 4 and the related volume can, (apart from confirming the integrity of a volume) indicate that an apparatus based on the transient pressure differential across a fluid high impedance can be used to specifically measure volume.

In this arrangement, a differential pressure transducer (with amplifier) rather than a simple switch would be placed in parallel fluid communication with the high impedance device. Controlled sudden application of a gas at pressure different to a reference pressure would be required to yield the transient pressure curve response.

Now that embodiments of this invention have been described in detail it will be apparent to those skilled in the arts that numerous modifications and variations may be made without departing from the basic inventive concepts. For example, the capacitive effect can be applied to single cavity systems, the fluid used in the systems can be a gas, a liquid, or a combination, or respective of the environment in which the structure being monitored is disposed. Naturally however in some environments, one pressure medium may be preferred over another. Further, the sub assemblies 14L and 14H as depicted in FIG. 8 can of course be used where the pressure source is a gas or a vacuum. Further, radio telemetry could be used for some applications and as an alternate to the use of electrical signals for communication in the telemetry system with the switches 42, light signals, using fibre optics can be used for signal transmission.

Also such modifications and variations are deemed to be within the scope of the present invention the nature of which is to be determined from the above description.

The claims defining the invention are as follows:

1. A self-monitoring or self-testable system for condition monitoring of a structure including at least:

one or more of substantially sealed first cavities formed on or between surfaces of or within said structure;

a source of fluid at substantially constant pressure relative to a reference pressure where said constant pressure and said reference pressure are not the same, said source coupled to said first cavities through respective high fluid impedance devices sufficient to create detectable pressure differentials between said source and said cavities across said high fluid impedance devices;

a fluid capacitance in operative association with said first cavities and corresponding high fluid flow impedance device to facilitate transient flow of fluid through said corresponding high fluid flow impedance devices; and, a telemetry system operatively associated with said high fluid impedance devices for monitoring the transient or varying pressure differential across each high fluid impedance device and, when a change in pressure differential is monitored, providing a signal indicative of the location of the cavities coupled with the high fluid impedance device across which said pressure differential is monitored.

2. The system according to claim 1 further including a plurality of differential pressure switches, each switch coupled across a respective high fluid impedance device.

3. The system according to claim 2 further including a fluid source pressure monitor switch having a first input in fluid communication with said fluid source and a second input in communication with said reference pressure, said fluid source pressure monitor switch arranged to change state when fluid pressure at its first input is substantially equal to fluid pressure at its second input, and wherein said telemetry system includes means for providing a signal indicative of a change in state of said fluid source switch.

4. The system according to claim 3 further including a signal communication path between said differential pressure switches and said fluid source pressure monitor switch enabling said telemetry system to communicate with said switches.

5. The system according to claim 4 wherein said communication signal path provides parallel communication between said differential pressure switches and said telemetry system.

6. The system according to claim 5 wherein said fluid source pressure monitor switch is coupled in series in said signal communication path.

7. The system according to claim 4 wherein said signal communication path is a radio signal path and said telemetry system includes a plurality of radio transceivers one provided at each of said differential pressure switches and said fluid source pressure monitor switch.

8. The system according to claim 4 wherein said signal communication path includes a plurality of transmission lines with which said differential pressure switches and said fluid source pressure monitor switch are connected.

9. The system according to claim 8 wherein when said structure is made of an electrically conductive material, one of said transmission lines is comprised of said structure.

10. The system according to claim 2 wherein said telemetry system further includes a plurality of resonant traps or band pass filters, each tuned to different frequencies, respective ones of said resonant traps or band pass filters connected in a series with respective differential pressure switches.

11. The system according to claim 10 wherein said telemetry system further includes a plurality of electrical chokes, wherein individual chokes are coupled in parallel with respective resonant traps or band pass filters.

12. The system according to claim 11 further including an AC signal generator for producing AC signals of different frequencies for transmission to said differential pressure switches via said transmission lines.

13. The system according to claim 2 wherein each differential pressure switch is provided with a unique address which is communicated via said transmission lines when said switch undergoes a change in state.

14. The system according to claim 13 wherein said telemetry system includes a processor based device in communication with said switches via said transmission lines for reading said addresses.

15. The system according to claim 1 wherein said fluid source includes a gas source at a constant negative pressure relative to said reference pressure.

16. The system according to claim 1 wherein said fluid source includes a source of a liquid at a substantially constant pressure relative to the pressure of a reference liquid.

17. The system according to claim 16 wherein said cavities includes first and second groups of sub cavities, said first group of sub cavities interleaves with said second group of sub cavities, said first group of sub cavities in fluid communication with said liquid source and said second group of sub cavities in fluid communication with said reference pressure.

18. The system according to claim 16 wherein said fluid capacitance includes respective pressure variable volumes, such as accumulators coupled in series with said high fluid impedance devices for transient displacement of fluid relative to the cavities coupled to said high fluid impedance devices and a further fluid capacitance or pressure variable volume in fluid communication with said fluid source at a location beyond a most distant high fluid impedance device to provide transient displacement with respect to said source.

19. The system according to claim 1 wherein when said structure is in the form of a pipeline, said cavities are formed circumferentially on one or both of an outer circumferential surface and an inner circumferential surface of said pipeline.

20. A self-monitoring or self-testable method for condition monitoring of a structure including the steps of:
forming one or more substantially sealed first cavities on or between surfaces of, or within said structure;
providing a fluid source of substantially constant pressure relative to a reference pressure where said constant pressure and said reference pressure are not the same;
coupling said fluid source to said first cavities through respective high fluid impedance devices sufficient to create detectable respective pressure differentials between said source and said first cavities across said high impedance devices;
providing a fluid capacitance in operative association with said first cavities and corresponding high fluid impedance devices to facilitate transient flow of fluid through said corresponding high fluid impedance devices; and,
providing a telemetry system operatively associated with said high impedance devices for monitoring transient or varying pressure differential across each high impedance device and, when a change in said pressure differential is monitored, providing a signal indicative of the location of the cavities coupled with said high impedance device across which said pressure differential is monitored.

21. The method according to claim 20 wherein said step of providing a telemetry system includes providing a plurality of differential pressure switches, each switch coupled across a respective high impedance device.

22. The method according to claim 21 wherein said step of providing said telemetry system further includes:
providing a fluid source pressure monitor switch having a first input in fluid communication with said fluid source and a second input in fluid communication with a said reference pressure, said fluid source pressure monitor switch arranged to change state when fluid pressure at its first input is substantially equal to the reference fluid pressure at its second input; and,
configuring said telemetry system to provide a signal indicative of a change in state of said fluid source pressure monitor switch.

23. The method according to claim 22 wherein said step of providing a telemetry system further includes providing a signal communication path between said differential pressure switches and said fluid source pressure monitor switch enabling said telemetry system to communicate with said switches.

24. The method according to claim 23 wherein said differential pressure switches are coupled in said signal communication path in a manner to enable parallel communication with said telemetry system.

25. The method according to claim 24 wherein said fluid source pressure monitor switch is coupled in series in said signal communication path.

26. The method according to claim 25 wherein said signal communication path is provided as a radio signal path.

27. The method according to claim 25 wherein said signal communication path is provided as a plurality of transmission lines where said differential pressure switches are coupled parallel with each other across said transmission lines.

28. The method according to claim 27 wherein the step of providing said telemetry system further includes providing an AC signal generator for producing AC signals of different frequencies and transmitting said AC signals along said transmission lines; and, coupling a respective resonant trap or band pass filter in series with each differential pressure switch, said series resonance traps or band pass filters tuned to said different frequencies.

29. The method according to claim 28 further including said method further includes coupling respective electrical chokes in parallel with each resonant trap or band pass filter.

30. The method according to claim 27 further including the step of providing each switch with a unique address which is communicated via said transmission lines when a switch undergoes a change in state.

31. The method according to claim 30 wherein said step of providing said telemetry system includes providing a processor based device in communication with said switches via said transmission lines for reading said addresses.

32. The method according to claim 20 wherein said step of providing said fluid source includes providing a gas at a substantially constant negative pressure relative to said reference pressure.

33. The method according to claim 32 wherein said fluid capacitance is constituted by inherent elastic characteristic of gas provided by the source and the finite volume of at least said first cavities.

34. The method according to claim 20 wherein said step of providing a fluid source comprises providing a liquid source.

35. The method according to claim 34 wherein said step of providing a fluid capacitance includes providing a pressure variable volume or simulated liquid capacitance such as an accumulator.

36. The method according to claim 20 further including the steps of: temporarily coupling said cavities to said reference pressure to substantially equalise fluid pressure in said first cavities and said high impedance devices with said reference pressure; and, subsequently recoupling said fluid source to said cavities to produce a transient fluid flow through said fluid capacitance and a consequential transient differential pressure sequentially across each high fluid impedance device thereby inducing sequential cyclic switching of said differential pressure switches.

* * * * *